United States Patent
Rössner

(10) Patent No.: US 9,458,918 B2
(45) Date of Patent: Oct. 4, 2016

(54) HYDRODYNAMIC COUPLING ARRANGEMENT, IN PARTICULAR HYDRODYNAMIC TORQUE CONVERTER

(75) Inventor: Monika Rössner, Donnersdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 99 days.

(21) Appl. No.: 14/114,410

(22) PCT Filed: Mar. 27, 2012

(86) PCT No.: PCT/EP2012/055375
§ 371 (c)(1),
(2), (4) Date: Oct. 28, 2013

(87) PCT Pub. No.: WO2012/146450
PCT Pub. Date: Nov. 1, 2012

(65) Prior Publication Data
US 2014/0048371 A1   Feb. 20, 2014

(30) Foreign Application Priority Data
Apr. 28, 2011   (DE) ........................ 10 2011 017 658

(51) Int. Cl.
F16H 45/02   (2006.01)

(52) U.S. Cl.
CPC ......... F16H 45/02 (2013.01); *F16H 2045/021* (2013.01); *F16H 2045/0226* (2013.01); *F16H 2045/0284* (2013.01)

(58) Field of Classification Search
None
See application file for complete search history.

(56) References Cited

U.S. PATENT DOCUMENTS

| | | | | |
|---|---|---|---|---|
| 5,737,836 | A | * | 4/1998 | Finn et al. ................... 29/889.5 |
| 5,996,750 | A | * | 12/1999 | Roshangar .................... 192/3.29 |
| 6,155,392 | A | * | 12/2000 | Kundermann .................. 192/3.3 |
| 8,161,739 | B2 | | 4/2012 | Degler |
| 2001/0015308 | A1 | | 8/2001 | Heller et al. |
| 2004/0226794 | A1 | * | 11/2004 | Sasse et al. .................. 192/3.29 |
| 2005/0103593 | A1 | * | 5/2005 | Tanaka et al. .................. 192/57 |

FOREIGN PATENT DOCUMENTS

| | | |
|---|---|---|
| DE | 198 04 227 | 8/1999 |
| DE | 10 2008 030470 | 1/2009 |
| DE | 10 2008 057648 | 6/2009 |
| JP | 59-187158 | 10/1984 |
| JP | 2009-041662 | 2/2009 |
| WO | WO 89/02551 | 3/1989 |
| WO | WO 2009/122827 A1 * | 10/2009 |

\* cited by examiner

*Primary Examiner* — Richard Lorence
(74) *Attorney, Agent, or Firm* — Cozen O'Connor

(57) ABSTRACT

A hydrodynamic coupling arrangement, particularly hydrodynamic torque converter, comprises a housing arrangement filled with fluid, an impeller rotatable with the housing arrangement around an axis of rotation (A), a turbine arranged in the housing arrangement, and a torsional vibration damper arrangement with an input area which can be coupled to the housing arrangement by a lockup clutch. The driven hub comprises an inner circumferential toothing for coupling to an outer circumferential toothing of a driven member, such that it is fixed with respect to rotation relative to it. The turbine has a turbine hub with an inner circumferential toothing for coupling in a fixed manner with respect to relative rotation to an outer circumferential toothing at the driven hub and/or the outer circumferential toothing of the driven member.

10 Claims, 2 Drawing Sheets

Fig. 4
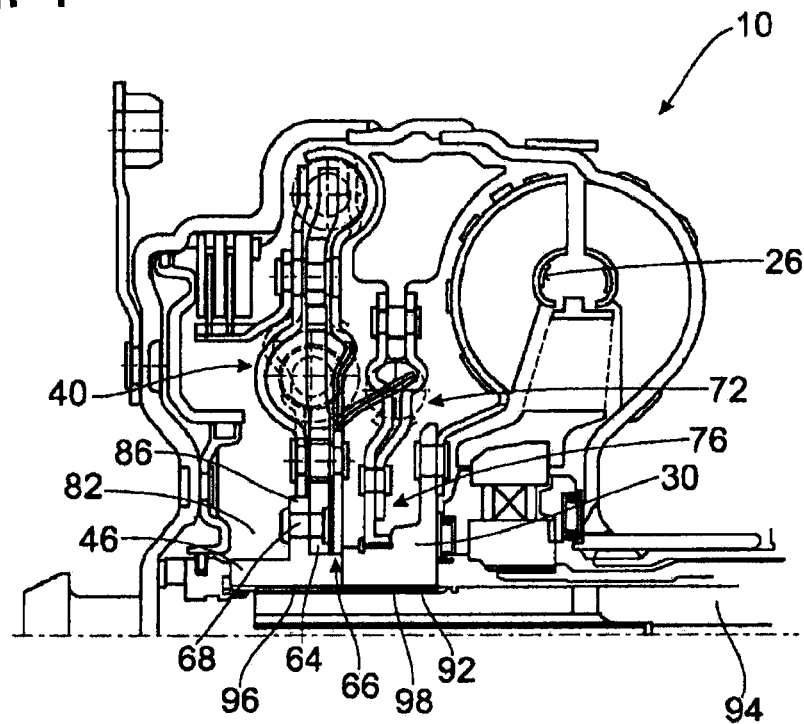
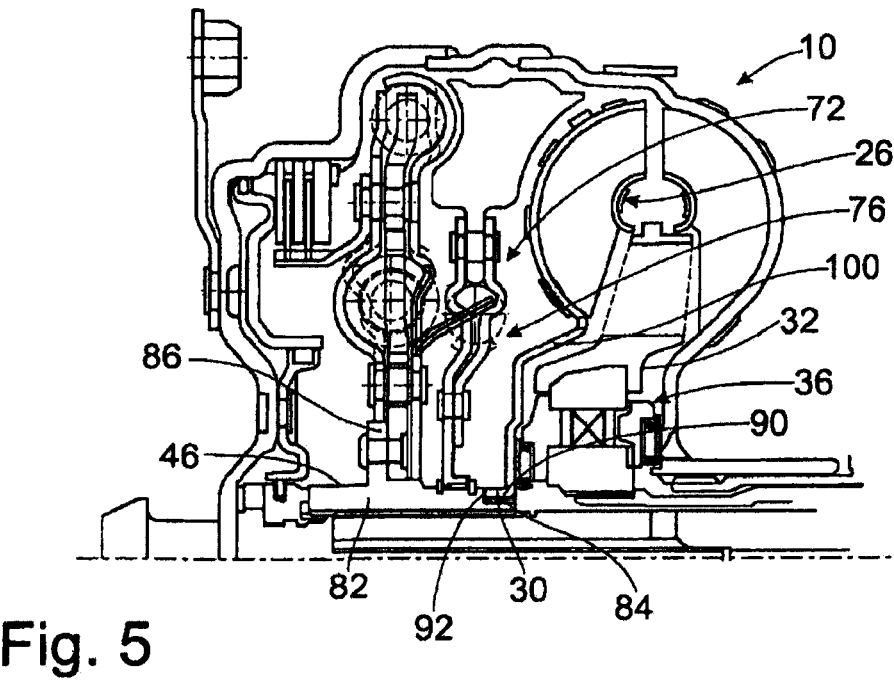
Fig. 5

HYDRODYNAMIC COUPLING ARRANGEMENT, IN PARTICULAR HYDRODYNAMIC TORQUE CONVERTER

PRIORITY CLAIM

This is a U.S. national stage of application No. PCT/EP2012/055375, filed on Mar. 27, 2012. Priority is claimed on the following application: Country: Germany, Application No.: 10 2011 017 658.6, Filed: Apr. 28, 2011, the content of which is incorporated herein by reference in its entirety.

FIELD OF THE INVENTION

The present invention is directed to a hydrodynamic coupling arrangement, particularly hydrodynamic torque converter, comprising a housing arrangement which is filled or fillable with fluid, an impeller which is rotatable with the housing arrangement around an axis of rotation, a turbine arranged in the housing arrangement, a torsional vibration damper arrangement with an input area which can be coupled to the housing arrangement by means of a lockup clutch and with an output area which is connected to a driven hub so as to rotate together therewith around the axis of rotation, and the driven hub comprises an inner circumferential toothing for coupling to an outer circumferential toothing of a driven member, preferably transmission input shaft, such that it is fixed with respect to rotation relative to it.

BACKGROUND OF THE INVENTION

A hydrodynamic coupling arrangement formed as a hydrodynamic torque converter is known from U.S. Pat. No. 8,161,739, wherein the torque is transmitted from a housing arrangement to a driven hub either via a lockup clutch and a torsional vibration damper arrangement or is transmitted to the driven hub via the hydrodynamic interaction between an impeller, which is rotatable with the housing arrangement, and a turbine. The turbine, together with a deflection mass carrier of a deflection mass unit, is fixed by riveting to an intermediate mass arrangement of the torsional vibration damping arrangement and is therefore torque-transmittingly connected to the driven shaft.

It is an object of the present invention to provide a hydrodynamic coupling arrangement by which a turbine can be torque-coupled to a driven hub in a structurally simple manner.

According to the invention, this object is met by a hydrodynamic coupling arrangement, particularly hydrodynamic torque converter, comprising a housing arrangement which is filled or fillable with fluid, an impeller which is rotatable with the housing arrangement around an axis of rotation, a turbine arranged in the housing arrangement, a torsional vibration damper arrangement with an input area which can be coupled to the housing arrangement by means of a lockup clutch and with an output area which is connected to a driven hub so as to rotate together therewith around the axis of rotation, and the driven hub comprises an inner circumferential toothing for coupling to an outer circumferential toothing of a driven member, preferably transmission input shaft, such that it is fixed with respect to rotation relative to it, wherein the turbine has a turbine hub with an inner circumferential toothing for coupling in a fixed manner with respect to relative rotation to an outer circumferential toothing at the driven hub and/or the outer circumferential toothing of the driven member.

In the construction according to the invention, the torque coupling of the turbine is carried out by toothing, namely the inner circumferential toothing which is provided at the turbine hub and which can be brought into rotational coupling engagement with an outer circumferential toothing either at the driven hub and/or at a driven member, e.g., a transmission input shaft. This rotational coupling engagement can be achieved without any further fastening processes, e.g., riveting or the like, in that the two structural component parts to be coupled are moved toward one another axially.

To form the driven hub in a simple manner for receiving torque from the torsional vibration damper arrangement as well as for receiving torque from the turbine, it is provided that the driven hub comprises a connection area for connecting to the output area and an outer circumferential toothing area axially adjacent to the connection area.

For a defined axial positioning of the turbine, it can be ensured in a simple manner that the driven hub has an axial supporting area for axially supporting the turbine hub.

Particularly when both the torsional vibration damper arrangement and the turbine are coupled to the driven hub for transmission of torque, the axial support can be carried out in a structurally simple manner in that the axial supporting area is provided in a transitional area between the connection area and the outer circumferential toothing area.

To provide a further damping aspect in addition to the vibration damping characteristic already provided by the torsional vibration damper arrangement, it is provided that a deflection mass unit comprises a deflection mass carrier and a deflection mass arrangement which is supported by means of a deflection mass coupling arrangement at the deflection mass carrier such that it can be deflected from a basic relative position with respect to the latter, and the deflection mass unit is radially and/or axially supported on the driven hub or turbine hub. Deflection mass units of this type may be constructed, for example, as fixed frequency mass dampers or speed-adaptive mass dampers and therefore are not generally located in the torque path but rather are coupled to torque-transmitting component assemblies and accordingly receive torsional vibrations and suppress them by generating a countervibration of the deflection mass arrangement. A defined centering or positioning of the deflection mass unit is ensured at the same time in that, further, the deflection mass unit is radially and/or axially supported on the driven hub and/or on the turbine hub.

In particular, it can be provided that the deflection mass arrangement is supported radially and/or axially on the driven hub or turbine hub. In other words, due to its support interaction, the deflection mass arrangement which is itself coupled only to the deflection mass carrier for carrying out vibrational movements ensures a defined positioning but at the same time is held at the supporting component assembly so as to be basically rotatable.

The deflection mass carrier can be supported at the torsional vibration damper arrangement, i.e., it can be fastened, for example, or formed integral with a component thereof, i.e., the deflection mass carrier can also be provided by the torsional vibration damper arrangement.

In an embodiment which is particularly advantageous with respect to vibration damping characteristics, it is provided that the torsional vibration damper arrangement comprises a first torsional vibration damper with a first primary side providing the input area and a first secondary side which is rotatable with respect to the first primary side around the axis of rotation against the action of a first damper element unit and a second torsional vibration damper with a second primary side and a second secondary side which is rotatable with respect to the second primary side around the axis of rotation against the action of a second damper element unit and which provides the output area, wherein the first secondary side and the second primary side provide an intermediate mass arrangement.

Further, when the deflection mass carrier is supported at the intermediate mass arrangement, the deflection mass unit contributes to an increase in the mass and, therefore, the mass moment of inertia, of the intermediate mass arrangement. This is particularly advantageous in the construction according to the invention because the turbine is mass-coupled to the output area of the torsional vibration damper arrangement, i.e., does not itself contribute to increasing the mass of the intermediate mass arrangement.

To produce the connection between the output area and the driven hub, it is provided that the driven hub comprises in a connection area a connection portion which projects radially outwardly and which is connected to the output area of the torsional vibration damper arrangement. In particular, it can further be provided that the output area is connected to the connection portion by at least one connection member, preferably a rivet bolt.

However, it should be noted that the output area, for example, a central disk element of the torsional vibration damper arrangement, can be formed integral with the driven hub in an alternative construction.

The turbine hub can be connected to the turbine by at least one connection member, preferably rivet bolt. This allows the turbine hub to be designed with high stability, particularly with respect to the inner circumferential toothing thereof.

In a very simple and economical alternative construction, it is provided
that the turbine hub forms an integral component part of the turbine, preferably of a turbine shell.

BRIEF DESCRIPTION OF THE DRAWINGS

The present invention will be described in detail in the following with reference to the accompanying drawings in which:

FIG. 4 is an alternative embodiment in a view corresponding to FIG. 1; and

FIG. 5 is another alternative embodiment in a view corresponding to FIG. 1.

DETAILED DESCRIPTION OF THE PRESENTLY PREFERRED EMBODIMENTS

Figure 1:
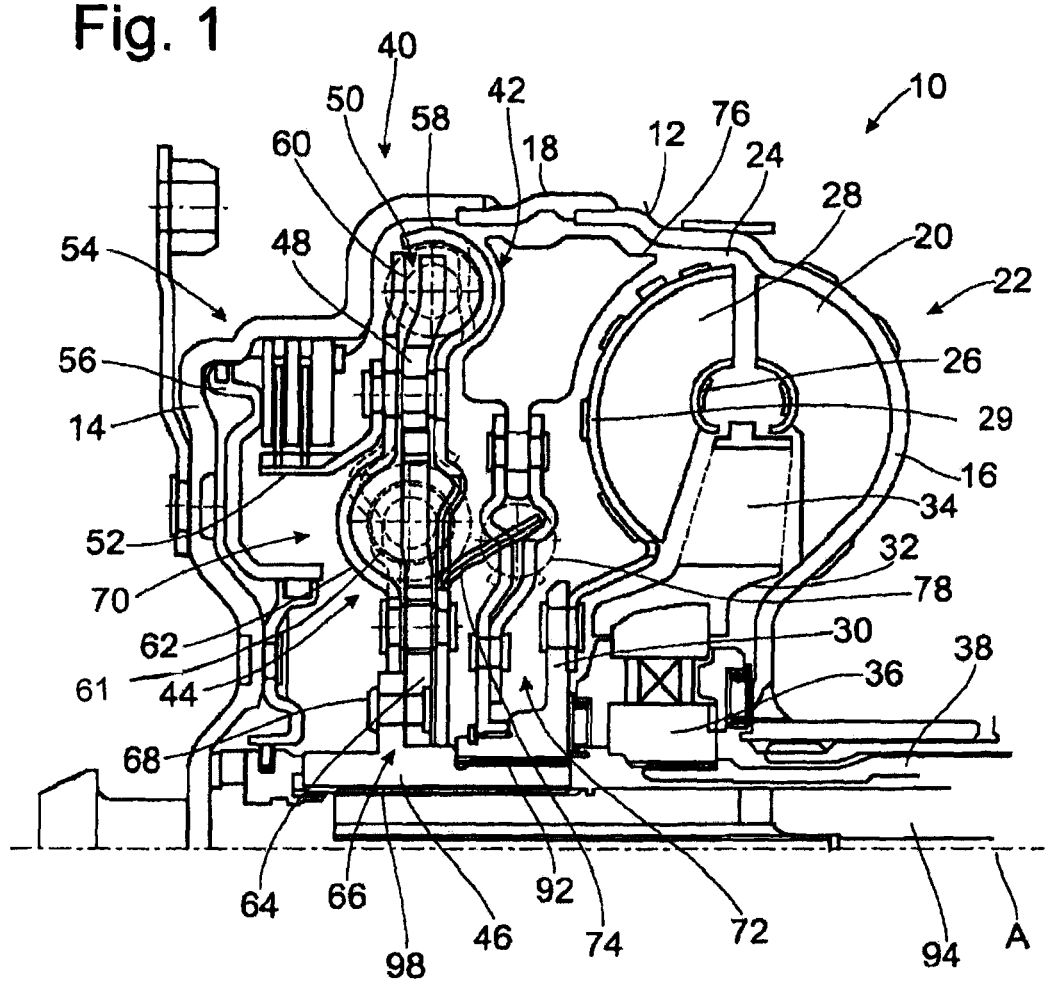
FIG. 1 is a partial longitudinal sectional view through a hydrodynamic coupling arrangement constructed as hydrodynamic torque converter.

FIG. 1 shows a hydrodynamic coupling arrangement 10 constructed as a hydrodynamic torque converter. The coupling arrangement 10 comprises a housing shell 14 which is to be connected on the drive side, i.e., facing a drive unit, and therefore for rotation together therewith and a housing shell 16 which is to be positioned on the driven side, i.e., facing a transmission. The two housing shells 14, 16 are fixedly connected to one another in their radially outer area by an annular housing part 18. A plurality of impeller blades 20 arranged consecutively around an axis of rotation A are provided at an inner side of the housing shell 16 so that the housing shell 16 with these impeller blades 20 essentially provides an impeller 22. A turbine 26 having turbine blades 28 which are positioned so as to face the impeller blades 20 is provided in an interior space 24 of the housing arrangement 12.

The turbine 26 comprises a turbine shell 29 which is fixedly connected in its radially inner area, for example, by riveting, to a turbine hub 30 which will be described more fully in the following.

A stator 32 is positioned with its stator blades 34 axially between the impeller 22 and the turbine 26. The stator 32 is supported on a supporting hollow shaft 38 by a freewheeling arrangement 36 so as to be rotatable in one direction around the axis of rotation A.

A torsional vibration damper arrangement 40 comprises two torsional vibration dampers 42, 44 which are positioned radially one inside the other and which act in series to transmit torque between the housing arrangement 12 and a driven hub 46. The radially outer torsional vibration damper 42 which is the first torsional vibration damper 42 in the torque path in the tension state comprises a first primary side 48 which is formed with a central disk element and which substantially provides an input area 50 of the torsional vibration damper arrangement 40. A friction element carrier 52 is fixedly connected to this input area 50, for example, by riveting. The friction element carrier 52 supports the driven-side friction elements, i.e., for example, plates, of a lockup clutch designated in its entirety by 54. The drive-side friction elements or plates are connected to the housing arrangement 16 for rotating jointly. A lock up clutch piston 56 presses the drive-side and driven-side friction elements into mutual frictional engagement to engage the lockup clutch 54 so that a direct torque transmission coupling is produced between the housing arrangement 12 and the torsional vibration damper arrangement 40.

It should be mentioned here that the lockup clutch 54 shown in FIG. 1 is depicted only by way of example. A different quantity of friction elements could also be provided at the drive side and at the driven side thereof. The clutch piston could also frictionally engage the housing arrangement 12 and be coupled to the input area 50.

A first secondary side 58 of the torsional vibration damper 42 comprises the radially outer area of two cover disk elements which are fixedly connected to one another by riveting or the like. The damper elements of a first damper element unit 60 act between the cover disk elements or first secondary side 58 and the central disk element, i.e., the first primary side 48. These damper elements can be provided, for example, by helical compression springs or the like which are consecutively arranged in circumferential direction or are nested one inside the other and are supported at respective supporting areas of the first primary side 48 and first secondary side 58.

In their radially inner area, the two cover disk elements form a second primary side 62 of the radially inner second torsional vibration damper 44. Its second secondary side 64 which is rotatable with respect to the second primary side 62 against the action of a second damper element unit 61 and which is substantially provided by a central disk element effectively forms the output area 66 of the torsional vibration damper arrangement 40. This output area 66 is connected to the driven hub 46 by riveting, i.e., by a plurality of rivets 68 consecutively arranged in circumferential direction in a manner to be described later.

The first secondary side 58 and the second primary side 62, i.e., essentially the cover disk elements providing the latter, form an intermediate mass arrangement 70 of the torsional vibration damper arrangement 40.

A deflection mass unit 72 formed as a fixed frequency mass damper is provided axially between the torsional vibration damper arrangement 40 and the turbine 26. This deflection mass unit 72 comprises a deflection mass carrier 74 which is formed integral with the intermediate mass arrangement 70 in this instance, a deflection mass arrangement 76 and a deflection mass coupling arrangement 78 by means of which the deflection mass arrangement 76 is force-transmittingly supported at the deflection mass carrier 74. The deflection mass coupling arrangement 78 can comprise flexible elements, e.g., helical compression springs, which are supported at respective circumferential supporting areas of the deflection mass carrier 74 on the one hand and at two cover disk-like disk elements of the deflection mass arrangement 76 on the other hand and which pre-load the deflection mass arrangement 76 in a basic relative position with respect to the deflection mass carrier 74. When torsional vibrations occur, the deflection mass arrangement 74 can be deflected in circumferential direction with respect to the deflection mass carrier 74, i.e., also with respect to the intermediate mass arrangement 70 in this instance, against the returning force of the deflection mass coupling arrangement 78 and can accordingly produce a vibration which counteracts an excited vibration and therefore suppresses it.

The deflection mass carrier 74 is provided by a plurality of axially deflected deflection mass carrying portions which are deflected by the cover disk element of the two cover disk elements which faces the turbine 26. Of course, the deflection mass carrier 74 could also be fastened to the intermediate mass arrangement 70 as a separate component assembly, for example, by riveting.

The deflection mass arrangement 76 is supported in radial direction in its radially inner area at the outer circumference of the turbine hub 30 and is also supported axially with respect to the turbine hub 30 by corresponding supporting areas. In this way, the entire deflection mass arrangement 76 is held in an axially and radially defined manner although, of course, the deflection mass arrangement 76 is basically rotatable with respect to the turbine hub 30. Accordingly, in this instance the deflection mass carrier 74 essentially does not perform the function of axial and/or radial centering of the deflection mass arrangement 76 but, rather, essentially that of coupling in a force-transmitting manner to the torque-transmitting component groups; the deflection mass unit 72 does not lie in the torque path between the housing arrangement 12 and the driven hub 46, i.e., does not itself transmit any driving torque or braking torque.

Figure 2:
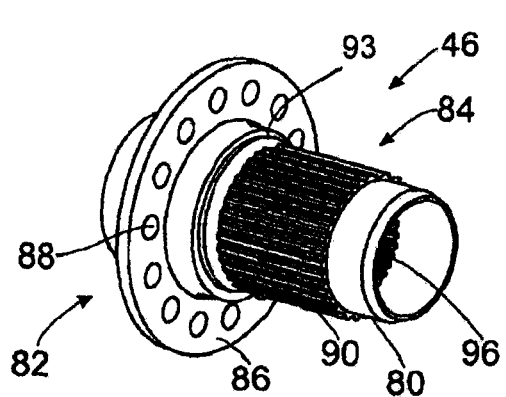
FIG. 2 is a perspective view of a driven hub of the hydrodynamic coupling arrangement of FIG. 1.
Figure 3:
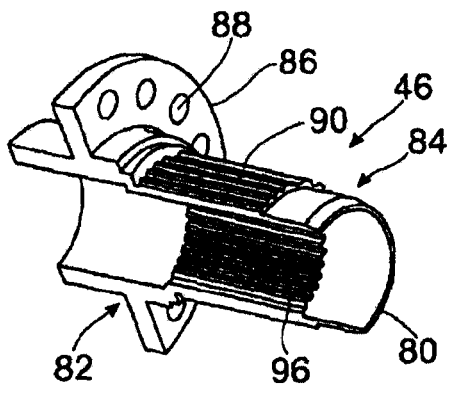
FIG. 3 is a in longitudinal sectional view of the driven hub of FIG. 1.

FIGS. 2 and 3 show a perspective view of the driven hub 46. This driven hub 46 comprises an approximately cylindrical hub body 80 which is substantially divided into a connection area 82 and an outer circumferential toothing area 84. A radially outwardly projecting annular or flange-like connection portion 86 with a plurality of openings 88 for the rivets 68 is formed at the connection area 82 for fixing the second secondary side 64, i.e., the output area 66, to the driven hub 46.

An outer circumferential toothing 90 which is formed, for example, as a spline is provided at the outer toothing area 84 and can be brought into rotational coupling engagement with a mating inner circumferential toothing 92 at the inner circumference of the turbine hub 30 so that the turbine 26 can be coupled to the driven hub 46 so as to be fixed with respect to rotation relative to it.

In a transition area provided substantially by a radial shoulder 93 between connection area 82 and outer circumferential toothing area 84, the turbine hub 30 can be supported axially, while support in the other axial direction can be carried out, for example, via a rolling element bearing at the freewheeling arrangement 36.

An inner circumferential toothing 96 is provided for coupling the driven hub 46 in a fixed manner with respect to rotation to a driven shaft 94 formed, for example, as transmission input shaft at the inner side of the hub body 80, for example, at the location where the outer circumferential toothing 90 is provided at the outer side. This inner circumferential toothing 96 can be brought into a rotational coupling engagement with an outer circumferential toothing 98 at the driven shaft 94.

All of these inner circumferential toothings and outer circumferential toothings can be formed as splines which can be brought into rotational coupling engagement by axially inserting one inside the other.

It will be seen from the preceding description that the turbine 26 in the construction of a hydrodynamic coupling arrangement 10 shown in FIG. 1 is torque-transmittingly coupled to the driven hub 46 parallel to the output area 66 of the torsional vibration damper arrangement; that is, the turbine 26 in this case contributes to the increase in the output-side mass, while the deflection mass unit 72 contributes to increasing the mass of the intermediate mass arrangement 70.

By means of the toothed coupling of the turbine hub 30 with the driven hub 46 on the one hand and the toothed coupling of the driven hub 46 with the driven shaft 94 on the other hand, a rotational coupling state is achieved which is simple to produce in terms of construction but which nevertheless operates in a stable manner and renders it unnecessary for any of these component groups which are to be coupled to one another for transmitting torque to be fixedly connected to one another, for example, by riveting or the like.

FIG. 4 shows a modified embodiment form of a hydrodynamic coupling arrangement 10 which corresponds in terms of its basic construction to the construction described above referring to FIG. 1. Accordingly, reference is had to the preceding description in this regard. In the construction shown in FIG. 4, the turbine hub 30 and the driven hub 46 are axially adjacent, i.e., they are not structurally connected to one another or centered radially with respect to one another. The inner circumferential toothing 92 of the driven hub 30 is in rotational coupling engagement with the outer circumferential toothing 98 of the driven shaft 94. At the same time, the inner circumferential toothing 96 of the driven hub 46 is in rotational coupling engagement with the outer circumferential toothing 98 of the driven shaft 94. The turbine hub 30 can be supported axially at the driven hub 46 which in turn can be supported axially just as in the embodiment form in FIG. 1 via a housing hub or the like at the housing shell 14, i.e., the housing arrangement 12.

The deflection mass arrangement 76 of the deflection mass unit 72 is radially and axially supported at the outer circumference of the turbine hub 30 but so as to be basically rotatable with respect to it.

In the constructional variant shown in FIG. 5 in which the basic construction of the hydrodynamic coupling arrangement again corresponds to that shown in FIG. 1, the driven hub 46 is formed so as to be longer axially. In its area in axial proximity to the stator 32, it has the outer circumferential toothing 90 of the outer circumferential toothing area 84. The driven hub 30 is provided in this case by the radially inner and, e.g., axially sloping region of a turbine shell 100 of the turbine 26. This turbine shell 100 is supported on one hand axially with respect to the freewheeling arrangement 36, for example, by means of a rolling element bearing. On the other hand, the turbine hub 30 is supported in an axial end area at a step-shaped transition area 92 of the driven hub 46.

The deflection mass arrangement 76 of the deflection mass unit 72 is radially supported and also held in an axially defined manner, for example, by two retaining rings, at the outer circumference of the driven hub 46 axially between the outer circumferential toothing 90 and the radially outwardly extending connection portion 86. The deflection mass arrangement 76 is also basically rotatable with respect to the driven hub 46 in this instance.

It should be noted with regard to the embodiment forms of a hydrodynamic coupling arrangement 10 described above that many variations are possible with respect to construction. For example, the lockup clutch could be constructed differently than the depicted lockup clutch. Also, the torsional vibration damper arrangement could be formed, for example, with only one torsional vibration damper whose output area would then be coupled to the driven shaft by the driven hub. Also, the output area of the torsional vibration damper arrangement, i.e., a central disk-shaped secondary side, for example, could be formed integral with the driven hub.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A hydrodynamic coupling arrangement, particularly hydrodynamic torque converter, comprising
   a housing arrangement (12) fillable with fluid;
   an impeller (22) rotatable with the housing arrangement (12) around an axis of rotation (A);
   a turbine (26) arranged in the housing arrangement (12);
   a torsional vibration damper arrangement (40) comprising an input area (50) which can be coupled to the housing arrangement (12) by a lockup clutch (54) and further comprising a driven hub (46) and an output area (66) connected to the driven hub (46) so as to rotate together therewith around the axis of rotation (A);
   a driven member (94) having an outer circumferential toothing (98);
   wherein the driven hub (46) comprises an outer circumferential toothing (90) and an inner circumferential toothing (96), the inner circumferential toothing (96) for coupling to the outer circumferential toothing (98) of the driven member (94) such that the driven hub (46) is fixed with respect to rotation relative to the driven member (94); and wherein the turbine (26) comprises a turbine hub (30) with an inner circumferential toothing (92) for coupling in a fixed manner with respect to relative rotation to one of the outer circumferential toothing (90) at the driven hub (46) and the outer circumferential toothing (98) of the driven member (94);
   wherein the driven hub (46) comprises a connection area (82) for connecting to the output area (66) and an outer circumferential toothing area (84) axially adjacent to the connection area (82);
   wherein the driven hub (46) comprises an axial supporting area for axially supporting the turbine hub (30); and
   wherein the axial supporting area is provided in a transitional area between the connection area (82) and the outer circumferential toothing area (84);
   additionally comprising a deflection mass unit (72) comprising a deflection mass coupling arrangement (78), a deflection mass carrier (74) and a deflection mass arrangement (76) supported by the deflection mass coupling arrangement (78) at the deflection mass carrier (74) such that the deflection mass arrangement (76) can be deflected from a basic relative position with respect to the deflection mass carrier (74), wherein the deflection mass unit (72) is one of radially and axially supported on one of the driven hub (46) and the turbine hub (30).

2. The hydrodynamic coupling arrangement according to claim 1, wherein the deflection mass arrangement (76) is one of radially and axially supported on one of the driven hub (46) and the turbine hub (30).

3. The hydrodynamic coupling arrangement according to claim 1, additionally comprising a deflection mass carrier (74); and wherein the deflection mass carrier (74) is supported at the torsional vibration damper arrangement (40).

4. The hydrodynamic coupling arrangement according to claim 3, additionally comprising an intermediate mass arrangement (70); and wherein the deflection mass carrier (74) is supported at the intermediate mass arrangement (70).

5. The hydrodynamic coupling arrangement according to claim 1, wherein the torsional vibration damper arrangement (40) comprises a first torsional vibration damper (42) with a first primary side (48) forming the input area (50) and a first secondary side (58) which is rotatable with respect to the first primary side (48) around the axis of rotation (A) against the action of a first damper element unit (60) and a second torsional vibration damper (44) with a second primary side (62) and a second secondary side (64) which is rotatable with respect to the second primary side (62) around the axis of rotation (A) against the action of a second damper element unit and which forms the output area (66); and wherein the first secondary side (58) and the second primary side (62) form an intermediate mass arrangement (70).

6. The hydrodynamic coupling arrangement according to claim 1, wherein the driven hub (46) comprises the connection area (82) a connection portion (86) which projects radially outwardly and which is connected to the output area (66) of the torsional vibration damper arrangement (40).

7. The hydrodynamic coupling arrangement according to claim 6, wherein the output area (66) is connected to the connection portion by at least one connection member (68).

8. The hydrodynamic coupling arrangement according to claim 1, wherein the turbine hub (30) is connected to the turbine (26) by at least one connection member.

9. The hydrodynamic coupling arrangement according to claim 1, wherein the turbine hub (30) forms an integral component part of the turbine (26).

10. The hydrodynamic coupling arrangement according to claim 1, wherein the turbine (26) includes a turbine shell (100) and wherein the turbine hub (30) forms an integral component part of the turbine shell (100).

\* \* \* \* \*